Feb. 19, 1935.  E. H. NEEDHAM  1,991,692
FREEWHEELING DRIVE
Filed Feb. 27, 1934
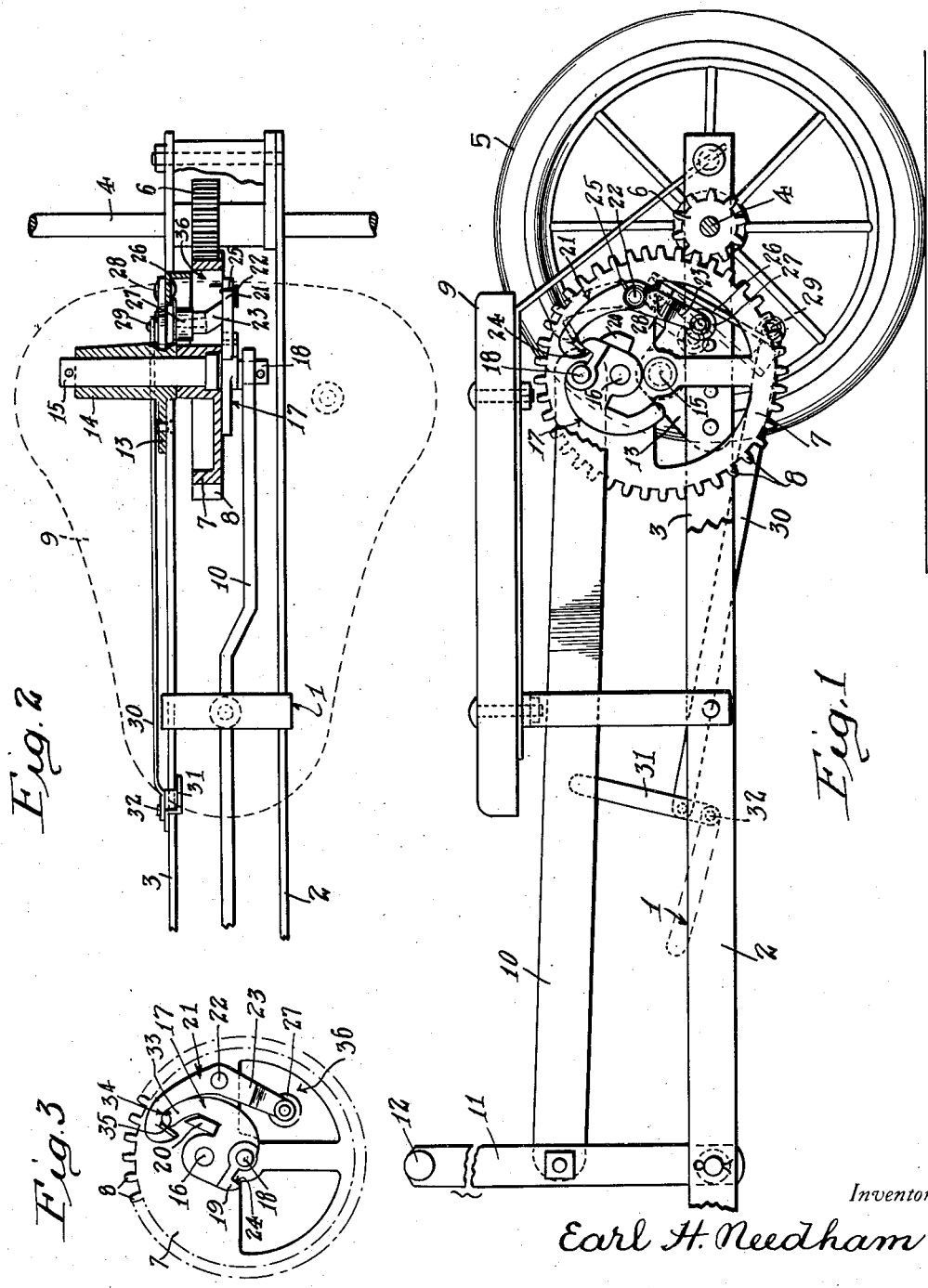
Inventor
Earl H. Needham
By Lyon & Lyon
Attorneys Patented Feb. 19, 1935

1,991,692

UNITED STATES PATENT OFFICE 1,991,692

FREEWHEELING DRIVE

Earl H. Needham, Balboa Island, Calif.

Application February 27, 1934, Serial No. 713,122

8 Claims. (Cl. 74—600)

This invention relates to a free-wheeling drive, and while the invention may be employed for different specific purposes, in the present specification it is described as applied to a hand-driven child's vehicle. Such a vehicle is usually propelled by a handle-bar which rocks to and fro on an axis. If the vehicle is not provided with a free-wheeling drive, the handle-bar will continue to rock back and forth when the vehicle is coasting, and unless the child is careful, he may be struck by the handle-bar in its swinging movement.

In the preferred embodiment of the invention, the mechanism includes a crank, which is pivotally mounted on the driven member on an eccentric axis, that is to say, an axis that is eccentric with the axis of rotation of the driven member. When the vehicle is being driven through its transmission means, the rotation of the crank pin is imparted to the driven member by reason of the fact that the driven member limits the rotation of the crank on its own axis of rotation; when the driving through the transmission means ceases, the crank rotates relatively backward with respect to the driving direction, and brings the crank pin into substantial alignment with the axis of rotation of the driven member. Then the crank pin has no radius of action and hence no movement is imparted to the transmission means by the rotation of the driven member when the vehicle is coasting.

One of the objects of this invention is to provide mechanism of this type, with means for yieldingly holding the crank pin in this inactive position in which the crank pin is in alignment with the axis of rotation of the driven member. This is desirable because in practice, it is found that unless such holding means is provided, there is a tendency for the crank to throw itself out of the inactive position.

A further object of the invention is to provide a drive of this type with means whereby the driving mechanism can, at will, readily be operated to shift the crank pin from its free-wheeling position to its normal driving position.

A further object of the invention is to provide a drive of this type with means for latching the crank in its normal active position, and for automatically effecting the release of the latch at a point in the revolution of the driven member; also to provide hand-controlled means for controlling the latch capable of being held in an active or an inactive position so as to enable the vehicle to be driven at will, with the free-wheeling function of the drive inhibited.

Further objects of the invention will appear hereinafter.

Although the invention is described in the following specification as applied to a vehicle, it is expected to be useful also, when used in the drive for merry-go-rounds or other types of amusement devices.

The invention consists in the novel parts and combination of parts to be described hereinafter, all of which contribute to produce an efficient free-wheeling drive.

A preferred embodiment of the invention is described in the following specification, while the broad scope of the invention is pointed out in the appended claims.

In the drawing:

Figure 1 is a side elevation of a child's vehicle embodying my invention, certain parts being broken away and others shown in section.

Figure 2 is a plan of the parts shown in Fig. 1.

Figure 3 is a side elevation illustrating the drive held yieldingly in the inactive crank position; that is to say, this view represents the parts of the driving mechanism in the relation which they have when the vehicle is free-wheeling.

Referring more particularly to the parts, 1 indicates the frame of the vehicle, which includes a pair of substantially parallel frame bars 2 and 3. At its forward end the frame is supported on a wheel or wheels, not illustrated. At its rear end the frame is supported on a rear axle 4, which carries two wheels such as the wheel 5, one of which is rigid with the axle, and the other of which is loose on the axle. The rear axle carries a pinion 6, which is actuated by the driven member 7 of my free-wheeling drive, said driven member 7 having gear teeth 8 that mesh with the teeth of the pinion 6 to drive the same.

The frame 1 supports a seat 9 for the child, and the child drives the driven member 7 through the medium of a link 10, the forward end of which is attached to a rock lever 11 pivotally mounted on the frame and actuated by a handle-bar 12. Such a vehicle is usually driven by having the rear end of the link 10 attached to a crank pin on the side of a gear wheel corresponding to my driven member 7. In accordance with my invention, I provide a free-wheeling drive mechanism including a part corresponding to the gear wheel that meshes with the pinion 6.

The frame 1 carries a bearing bracket 13 secured to the frame bar 3, and this bracket has a bearing 14 for a shaft 15 to which I attach my driven member 7.

On the side of the driven member 7, I provide a pivotal connection 16 for a crank 17, and this pivotal connection 16 has its axis eccentric to the axis of the shaft 15. This crank 17 carries a crank pin 18, which is at substantially the same distance from the axis of the pivotal connection 16, as the pivotal connection 16 is distant from the axis of the shaft 15. The end of the link 10 attaches to the crank pin 18, and in the position of the parts illustrated in Figure 2, the link 10 will be exerting a thrust upon the pin 18 toward the right. The crank includes an abutment 19 that engages stop means 20 on the driven member 7. This enables the link to drive the driven member 7 in a forward direction.

The crank is normally latched in this active position by latching mechanism, which preferably includes a latching arm 21 that is pivotally mounted on a pin 22 on the driven member 7, and this latching means preferably includes a rigid actuating arm 23 for facilitating throwing the latching arm out of engagement with the abutment 19 once in each revolution of the driven member 7. In this connection, it should be noted that the end of the latch arm 21 is preferably formed into a hook that engages a shoulder 24 on the abutment 19. A spring 25 mounted on the pivot 22 of the latch arm 21, normally holds the latch arm in engagement with the abutment.

In order to enable the vehicle to free-wheel when desired, I provide means for engaging the arm 23, that is controlled at will by the child. For this purpose I prefer to provide a cam 26 or other relatively fixed means that will engage the actuating arm 23 at each revolution. The actuating arm 23 is preferably provided with a roller 27 to engage this cam. This cam is preferably mounted on a pivot pin 28 on the bracket 13, and its lower end has a pivotal connection 29 to a controlling link 30 that extends forwardly and attaches to a control lever 31 pivotally mounted at 32 on the frame bar 3. In the position of the cam illustrated in full lines in Fig. 1, it is substantially out of the path of the roller 27; at least, it is sufficiently removed from the path of the roller to prevent it from releasing the latch arm 21. When the child desires to free-wheel the vehicle, he will push the lever 31 down into the position in which it is indicated in dotted lines in Fig. 1. This will move the cam 26 toward the left as viewed in Fig. 1, and at the next revolution when the roller strikes the cam the latch arm will be swung outwardly to release the crank. If the child ceases to operate the handle-bar 12, the crank 17 will then swing in an anti-clockwise direction on its pivot pin 16, and come to rest in the position indicated in Fig. 3 with the crank pin on the axis of the shaft 15. The crank 17 is preferably provided with a tail 33, the outer face 34 of which is struck on a radius having its center substantially at the axis of the pivot pin 16, and the inner face or edge 35 of the latch arm has a similar curvature so that these faces engage each other. By reason of the presence of the spring 25, frictional resistance is developed between these surfaces 34 and 35 for yieldingly holding the crank in its folded or inactive position. At this time the end of the tail 33 can be stopped against the hooked end of the latch arm 21, or the crank can be stopped against one edge of the stop 20.

As soon as the child wishes to resume the drive, all he has to do is to commence to rock the handle-bar 12. This will immediately pull the crank out of its inactive position and enable the parts to resume the driving relation illustrated in Fig. 1.

In the mechanism, as illustrated, the pivot 22 for the latch 21 is on the opposite side of the driven member 7 from the cam 26. Hence it is necessary to offset the outer end of the actuating arm 23 so that it passes through a large opening 36 formed in the driving member 7. For engaging the cam it is provided with the roller 27. It will be noted that the cam 26 will release the latch 21 when the crankpin is at an intermediate point in its travel between its dead centers. This is desirable because at this point, if the child is rocking the handle bar, driving force is being imparted to the crank through the drive link 10. Hence even if the cam is in position to disengage the latch 21, the disengagement will only be for an instant and will not affect the forward driving movement. For this reason it is evident that the means for throwing the cam out to its inactive position is not an essential part of the combination. It is, however, advantageous to hold the cam normally out of the path of the roller to avoid the noise of the roller striking the cam. It is obvious that this invention could be employed in a construction for changing the amount of stroke of a connecting rod by not permitting the crank pin to be thrown into exact alignment with the axis of shaft 15. That position of the crank pin is an extreme position, and it is evident that if the inward movement of the crank would stop short of this extreme position, the connecting rod would still be reciprocated more or less, depending upon the point at which the crank pin is held.

It is understood that the embodiment of the invention described herein is only one of the many embodiments this invention may take, and I do not wish to be limited in the practice of the invention, nor in the claims, to the particular embodiment set forth.

What I claim is:—

1. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, latching means for holding the crank in engagement with the stop, and means for releasing the latching means at a point in the revolution of the driven member, said crank operating when released, to swing on the eccentric axis and bring the crank pin into an inactive position substantially in axial alignment with the first-named axis.

2. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, a latch for holding the crank in engagement with the stop, means for releasing the latching means at a point in the revolution of the driven member, said crank operating when released, to swing on the eccentric axis and bring the crank pin into an inactive position substantially in axial alignment with the first-named axis, and means for yieldingly holding said crank in said inactive position.

3. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, latching means for holding the crank in engagement with the stop, and releasing mechanism for releasing the latching means at a point in the revolution of the driven member, including a movable part movable at will to inhibit the operation of the releasing mechanism, said crank operating when released, to swing on the eccentric axis and bring the crank pin into an inactive position substantially in axial alignment with the first-named axis.

4. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, latching means for holding the crank in engagement with the stop, a latch pivotally mounted on the driven member for engaging the crank to hold the same against said stop, and means capable of cooperating with the latch at a point in the revolution of the driven member to release the latch, said crank operating when released to swing on the eccentric axis and bring the crank pin into an inactive position substantially in axial alignment with the first-named axis.

5. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, latching means for holding the crank in engagement with the stop, a driving link connected with the crank-pin for rotating the same about the first-named axis, and means capable of releasing the latching means at a time in the revolution of the driven member when the crank pin is located at an intermediate point between its dead centers.

6. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, a latch pivotally mounted on the driven member for engaging the crank to hold the same against the stop means, and a relatively fixed part in the path of said latch for releasing the same at a point in the revolution of the driven member.

7. In a free-wheeling drive, the combination of a driven member having an axis of rotation, a crank pivotally mounted on said driven member on an eccentric axis with respect to the first-named axis, said crank having a crank-pin located at a distance from the eccentric axis substantially equal to the distance of the eccentric axis from the first-named axis, a stop on the driven member for engaging the crank to enable the crank to drive the driven member in a forward direction, a latch pivotally mounted on the driven member having a detent arm for engaging the crank to hold the same against the stop means, said latch having an actuating arm; and a relatively fixed cam capable of engaging the said actuating arm to release the detent arm at a point in the revolution of the driven member.

8. In a free-wheeling drive, the combination of a frame, a driven member having an axis of rotation on the frame, a crank pivotally mounted on said driven member on an axis eccentric to the first-named axis, said crank having a crank pin located at a distance from the eccentric axis substantitally equal to the distance of the eccentric axis from the first-named axis, a stop on the driven member engaging the crank to enable the crank to drive the driven member in a forward direction, a latch pivotally mounted on the driven member for engaging the crank to hold the same against the stop, said latch having an actuating arm, a cam movably supported on the frame and capable of engaging the actuating arm at a point in the revolution of the driven member to release the latch, and means for controlling the cam at will to prevent it from releasing the latch.

EARL H. NEEDHAM.